Figure 1:
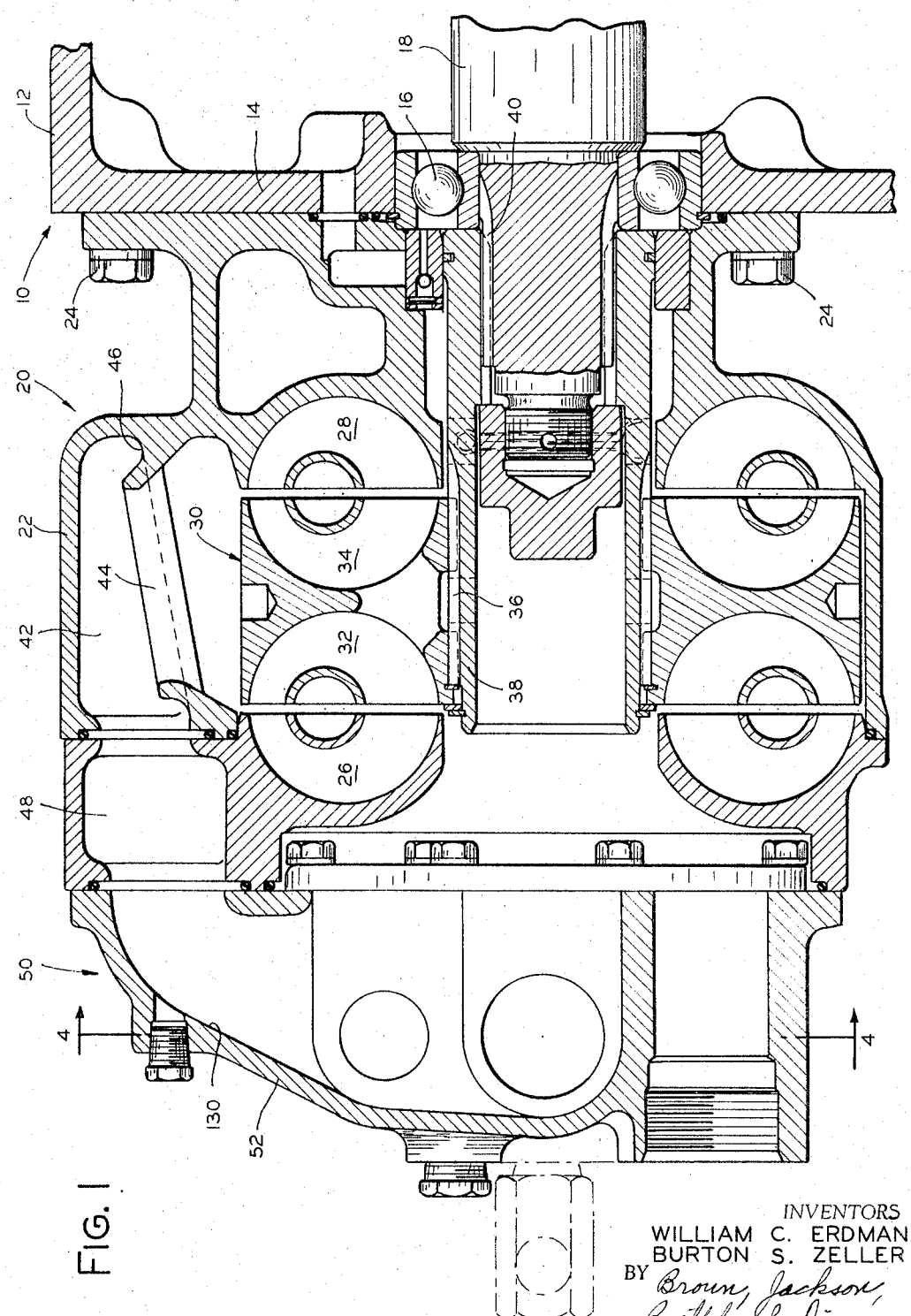

Jan. 10, 1967  W. C. ERDMAN ETAL  3,297,114
HYDRAULIC RETARDER AND CONTROL VALVE
Filed Jan. 25, 1965  4 Sheets-Sheet 1

INVENTORS
WILLIAM C. ERDMAN
BURTON S. ZELLER
BY Brown, Jackson,
Boettcher & Dienner
ATTORNEYS

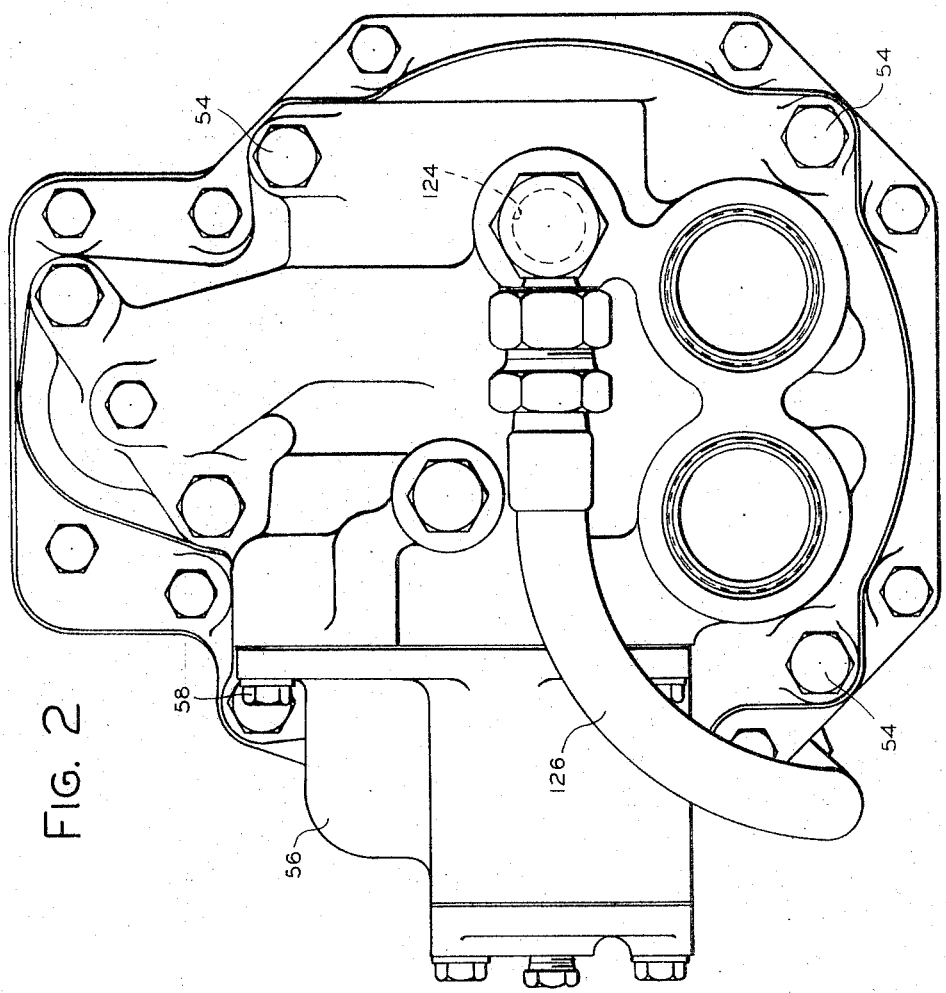
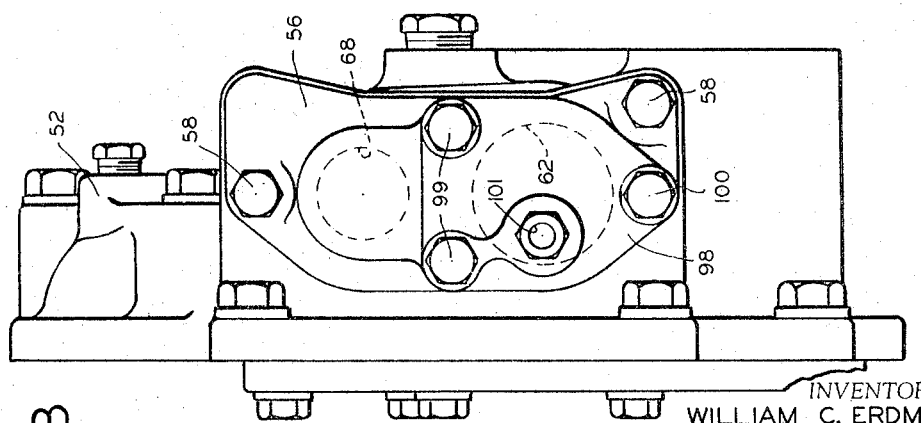

INVENTORS
WILLIAM C. ERDMAN
BURTON S. ZELLER
ATTORNEYS

INVENTORS
WILLIAM C. ERDMAN
BURTON S. ZELLER
BY Brown, Jackson,
Boettcher & Dienner
ATTORNEYS

United States Patent Office 3,297,114
Patented Jan. 10, 1967

3,297,114
HYDRAULIC RETARDER AND CONTROL VALVE
William C. Erdman, Jackson, and Burton S. Zeller, Parma, Mich., assignors to Clark Equipment Company, a corporation of Michigan
Filed Jan. 25, 1965, Ser. No. 427,774
6 Claims. (Cl. 188—90)

Our present invention relates generally to hydraulic control systems, and, more specifically, is directed to hydraulic control systems which are particularly adapted for use with hydraulic devices such as hydraulic fluid retarders.

A hydraulic fluid retarder is a type of fluid coupling having at least one stationary wheel section and one rotatable wheel section. Such a hydraulic fluid retarder may be used in connection with a gear transmission for braking the latter under certain conditions of operation, for example, when the vehicle with which these devices is associated is descending a long grade. In this application, the rotatable wheel section of the retarder is mounted on a rotating shaft of the vehicle drive means, which may be the output shaft of the transmission. The hydraulic fluid retarder is activated by supplying hydraulic fluid pressure thereto and is deactivated by releasing the pressure of the fluid within the retarder and draining the fluid therefrom. The degree of retardation is a function of the pressure of the hydraulic fluid within the retarder.

It is an object of our present invention to provide control systems for activating and deactivating hydraulic devices such as hydraulic fluid retarders.

It is another object of our present invention to provide control systems, as described, comprising control valve assemblies operable to direct hydraulic fluid under pressure either to the retarder when the latter is to be activated or to a fluid receiver when the retarder is to be maintained inactive.

It is a further object of our present invention to provide control valve assemblies, as described, which are operable to maintain a substantially constant predetermined fluid pressure within the retarder.

In our hydraulic system, which includes a hydraulic fluid retarder with an inlet side and an outlet side, a source of hydraulic fluid under pressure and hydraulic fluid receiver means, we provide a control valve assembly comprising first and second valve members. The first valve member has one position in which the source of hydraulic fluid is placed in communication with the hydraulic fluid receiver means for maintaining the hydraulic fluid retarder inactive, and has a second position in which the source of hydraulic fluid is placed in communication with the inlet side of the hydraulic fluid retarder for activating the latter. When the first valve member is in the second position, the second valve member is movable from a first position toward a second position in response to the pressure within the hydraulic fluid retarder to modulate communication between the outlet side of the retarder and the hydraulic fluid receiver means whereby to maintain a substantially constant predetermined pressure within the hydraulic fluid retarder.

In accordance with the principles of our present invention, movement of the first valve member between its two operating positions may be effected either by fluid operated means or by manually operated means. Additionally, we provide means for normally biasing the second valve member to its first position. Such biasing means predetermines the pressure that is to be maintained in the hydraulic fluid retarder when the latter is activated. Still further, in one embodiment of our control valve assembly we provide fluid operated means for varying the force of the biasing means acting on the second valve member whereby to permit adjustment of the pressure that is to be maintained in the retarder.

Now in order to acquaint those skilled in the art with the manner of constructing and using hydraulic control systems in accordance with the principles of our present invention, we shall describe in connection with the accompanying drawings, preferred embodiments of our invention.

Figure 4:
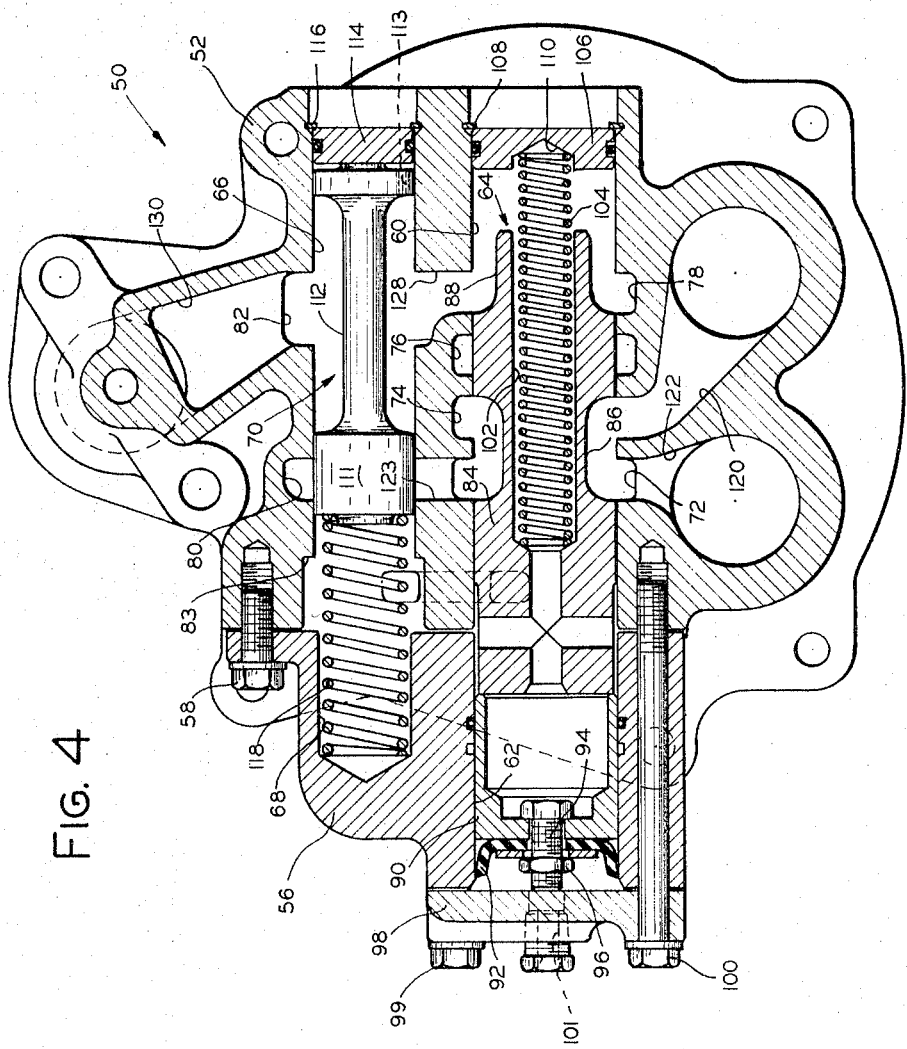
Figure 5:
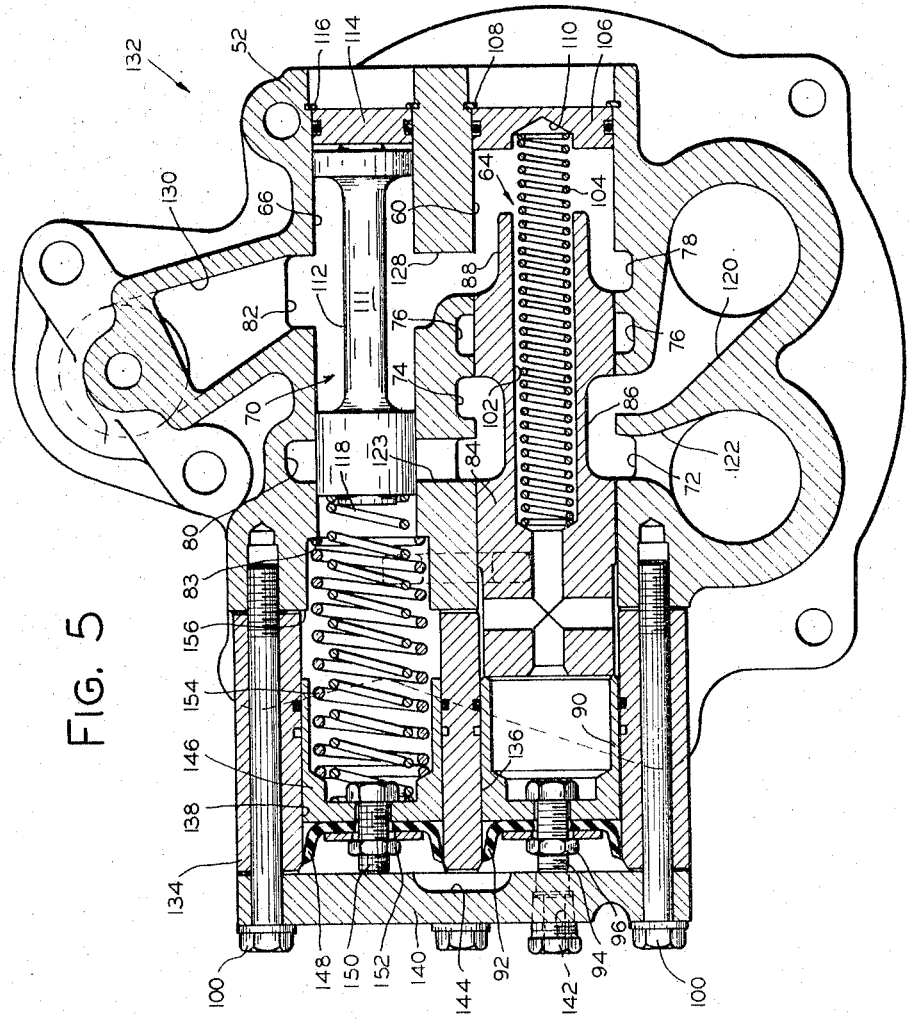
Figure 6:
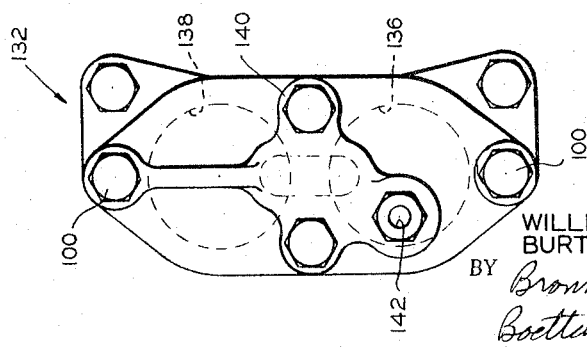

In the drawings:
FIGURE 1 is a median sectional view of a hydraulic fluid retarder and a control valve assembly incorporating the principles of our present invention;
FIGURE 2 is an end elevational view of the hydraulic fluid retarder and control valve assembly of FIGURE 1;
FIGURE 3 is a side elevational view of the control valve assembly of FIGURES 1 and 2;
FIGURE 4 is a sectional view of the control valve assembly of our present invention, taken substantially along the line 4—4 in FIGURE 1, looking in the direction indicated by the arrows;
FIGURE 5 is a sectional view of a modified embodiment of control valve assembly incorporating the principles of our present invention; and
FIGURE 6 is a side elevational view of the control valve assembly of FIGURE 5.

Referring now to FIGURE 1, there is indicated generally by the reference numeral 10 a portion of a gear transmission which may be incorporated in a vehicle such as a truck. The transmission 10 is comprised of a housing 12 with a rear end wall 14 in which is suitably journalled, as by a ball bearing assembly 16, an output shaft 18. Reference numeral 20 indicates a hydraulic fluid retarder comprising a housing 22, which may be fabricated in two or more sections to facilitate manufacture and assembly, and which is secured, as by bolts 24, to the rear end wall 14 of the transmission housing 12. The retarder 20 is provided to selectively brake or retard the rotation of the transmission output shaft 18. The retarder housing 22 is provided interiorly with axially spaced stationary wheel sections 26 and 28 of circumferentially spaced blades or vanes. Arranged intermediate of the stationary wheels 26 and 28 is a rotatable member 30 having opposed wheel sections 32 and 34 of circumferentially spaced blades or vanes that respectively face and cooperate with the stationary wheel sections 26 and 28. The rotatable member 30 is splined or otherwise suitably mounted, as at 36, on the one end of a sleeve member 38 which at its other end is splined or otherwise suitably mounted, as at 40, on the end of the transmission output shaft 18 that projects into the retarder housing 22. Accordingly, the rotatable member 30 and associated wheel sections 32 and 34 are mounted for conjoint rotation with the transmission output shaft 18. Immediately above the rotatable member 30, the retarder housing 22 is formed with a cavity 42 and with an inwardly and upwardly directed generally rectangular ring flange portion 44 which serves to define a trough 46 inclined downwardly in the direction of a second cavity 48 formed in the retarder housing 22 and communicating with the cavity 42. In accordance with the principles of our present invention, control of the flow and pressure of hydraulic fluid in the hydraulic retarder 20 is adapted to be effected by means of a valve assembly, one embodiment of which is indicated generally by the reference numeral 50.

The control valve assembly 50 comprises a main housing section 52 secured, as by bolts 54 (FIGURE 2), to the side of the retarder housing 22. An extension section 56 is secured, as by bolts 58, to the one side of the main housing section 52. As shown in FIGURE 4, axially aligned openings 60 and 62 are formed respectively in the housing section 52 and extension section 56 whereby to define a generally cylindrical valve chamber 64. Axially aligned openings 66 and 68 are also formed respectively in the housing section 52 and extension section 56 whereby to define a generally cylindrical valve chamber 70 that extends parallel to the valve chamber 64. The opening 60 of the valve chamber 64 has formed in the periphery thereof axially spaced annular grooves 72, 74, 76 and 78, and the opening 66 of the valve chamber 70 has formed in the periphery thereof axially spaced annular grooves 80 and 82. The end of the opening 66 adjacent the opening 68 may be enlarged to define a shoulder 83 for use in the modified control valve assembly of our present invention to be described hereinafter.

Slidably mounted in the valve chamber 64 is a spool valve member 84 having annular channels 86 and 88 formed in the periphery thereof. Disposed within the opening 62 of the valve chamber 64 is a generally hollow piston 90 having a dish-shaped flexible seal member 92 at the left end thereof as viewed in FIGURE 4. The member 92 is mounted to the piston 90 by means of a central axial bolt 94 and a nut 96 threaded thereon. The end of the opening 62 is closed by a plate member 98 secured, as by bolts 99, to the extension section 56. The plate member 98 and extension section 56 are also jointly secured to the main housing section 52 by a bolt 100. A fluid inlet 101 (FIGURE 3) in plate member 98 communicates with the opening 62. The valve member 84 at its right end, as viewed in FIGURE 4, is provided with a central axial opening 102 which serves to receive a coil spring 104. Mounted in the right end of the opening 60 is a closure disc 106 maintained in position by means of a snap ring 108. The coil spring 104 at its right end seats within a recess 110 formed in the closure disc 106, and serves to normally bias the valve member 84 and piston 90 to the left with the outer end of the bolt 94 engaging the plate member 98. Slidably mounted in the valve chamber 70 is a spool valve member 111 having an annular channel 112 formed in the periphery thereof. Mounted in the right end of the opening 66 is a closure disc 114 which is positioned by means of a snap ring 116. Disposed in the valve chamber 70, at the left end thereof, is a coil spring 118 which seats at the end of the blind opening 68 in the extension section 56 and abuts the left end of the valve member 111 whereby to normally bias the latter to the position shown with the right end thereof engaging the closure disc 114.

The annular groove 74 of the valve chamber 64 has communication through a fluid passageway 120 to a source of hydraulic fluid under pressure such as the discharge side of a hydraulic torque converter (not shown) associated with the gear transmission 10. The annular groove 72 of the valve chamber 64 communicates through a fluid passageway 122 with a hydraulic fluid receiver (not shown) such as a cooler, and also communicates through a fluid passageway 123 with the annular groove 80 in the valve chamber 70. The annular groove 76 of the valve chamber 64 communicates through fluid passageway means (not shown) with the interior or inlet side of the retarder 20. The right end of the valve chamber 64 is formed with a drain aperture 124 (FIGURE 2) which communicates with a drain line 126 connected for example to a sump tank (not shown). The annular groove 78 in the valve chamber 64 communicates through a fluid passageway 128 with the annular groove 82 of the valve chamber 70 which, in turn, communicates through a fluid passageway or cavity 130 with the cavity 48 in the retarder housing 22.

When the valve members 84 and 111 are in the positions shown in FIGURE 4, the annular channel 86 of the valve member 84 places the annular grooves 72 and 74 of the valve chamber 64 in communication, whereupon the fluid passageway 120 communicating with the source of fluid under pressure is interconnected with the fluid passageway 122 having communication with the fluid receiver. At the same time, the fluid cavities 42 and 48 of the retarder 20 and the fluid cavity 130 of the valve assembly 50 are placed in communication with the drain aperture 124 and the drain line 126 through the annular groove 82 of the valve chamber 70, fluid passageway 128, annular groove 78 of the valve chamber 64, annular channel 88 of the valve member 84, and the interior of the valve chamber 64 itself. Under these conditions of operation, fluid under pressure is transmitted directly from the source to the fluid receiver with the retarder 20 being by-passed so as to be maintained inactive.

Now if the operator of the vehicle with which the above described mechanisms are associated wishes to brake the vehicle as, for example, when the vehicle is descending a long grade, the retarder 20 may be activated for imposing a braking or retarding force on the transmission output shaft 18. Energization or activation of the retarder 20 may be accomplished by the operator directing pressurized air through the inlet 101 of the valve chamber 64 so as to move the piston 90 and, in turn, the valve member 84 to the right, as viewed in FIGURE 4, until the right end of the valve assembly 84 abuts the closure disc 106. When the valve member 84 is in this position, the annular channel 86 thereof places the annular grooves 74 and 76 of the valve chamber 64 in communication thereby directing fluid under pressure from the fluid pressure source to the interior or inlet side of the retarder 20. At the same time, the valve member 84 serves to close off communication between the annular grooves 72 and 74 of the valve chamber 64 and also to close off communication of the annular groove 78 of the valve chamber 64 with the interior of the latter and the drain aperture 124. Fluid entering the retarder 20 is thrown upwardly into the cavity 42 and flows therefrom through the cavity 48, the fluid cavity 130, and the annular groove 82 into the valve chamber 70 and about the annular channel 112 of the valve member 111. As the pressure of the fluid builds up within the retarder 20 and the interconnecting cavities and fluid passageways, the valve member 111 is shifted thereby to the left by fluid which is communicated to the right end of valve member 111 through a passage 113, as viewed in FIGURE 4, against the force of the coil spring 118. When the pressure acting on the valve member 111 exceeds a predetermined value determined by the rate of spring 118, the annular channel 112 places the annular grooves 80 and 82 of the valve chamber 70 into communication whereby to permit the fluid under pressure to flow through the fluid passageway 123 to the annular groove 72 in the valve chamber 64 and then through the fluid passageway 122 to the fluid receiver. The valve member 111 thus serves as a pressure relief valve and modulates the flow of fluid under pressure from the outlet side of the retarder 20 to the fluid receiver whereby to maintain a substantially constant predetermined pressure within the retarder 20.

When the braking operation of the vehicle has been completed, the operator releases the pressurized air from the inlet 101 of the valve chamber 64 thereby permitting the piston 90 and the valve member 84 to be returned by the spring 104 to the position shown in FIGURE 4. During such movement of the valve member 84, communication between the source of fluid under pressure and the inlet side of the retarder 20 is interrupted, and the source of fluid under pressure is again placed in direct communication with the fluid receiver. Also, communication is reestablished between the annular groove 78 of the valve chamber 64 and the drain aperture 124 whereby to permit draining of fluid from the retarder 20 and the interior of the control valve assembly 52. In this connection, fluid thrown upwardly within the retarder 20 is collected by the trough 46 and conveyed thereby outwardly of the cavity 42.

In the operation of the retarder 20, the higher the pressure of the fluid therein, the greater is the retarding effect produced thereby. Under certain conditions of operation, it is desirable to be able to vary the pressure of the fluid within the retarder 20 so as to vary the effective retardation. In the described control valve assembly 50, the pressure level at which the valve member 111 modulates the flow of fluid under pressure from the outlet side of the retarder 20 to the fluid receiver will remain substantially constant unless the spring 118 is replaced by another spring with a different rate. This of course cannot be done while the retarder is in operation and is inconvenient at other times. Accordingly, we propose to provide, in a modified embodiment of control valve assembly, a variable pressure modulating valve 111 which can be readily adjusted to permit the pressure within the retarder 20 to be varied. This modified form of control valve assembly, which is indicated generally by the reference numeral 132 in FIGURES 5 and 6, is identical in construction to the control valve assembly 50 with exceptions to be presently described, and like reference numerals have been used to identify the same or similar elements. In the control valve assembly 132, the extension section 56 is replaced by an extension section 134 which is formed with parallel openings 136 and 138 that are aligned with the openings 60 and 66 in the main housing section 52 whereby to define valve chambers 64 and 70. The ends of the openings 136 and 138 are closed by a common plate member 140 which is secured in position by means of bolts 100 extending through the extension section 134 and threaded into the main housing section 52. A fluid inlet 142 (FIGURE 6) communicates with the left end of the opening 136, as viewed in FIGURE 5, and a channel 144 (FIGURE 6) places the openings 136 and 138 in communication. Disposed within the opening 138 of the valve chamber 70 is a generally hollow piston 146 having a dish-shaped flexible seal member 148 at the left end thereof as view in FIGURE 5. The member 148 is mounted to the piston 146 by means of a central axial bolt 150 and a nut 152 threaded thereon. The piston 146 serves to receive the left ends of coil spring 118 and an additional coil spring 154 the right end of which abuts the shoulder 83 in the opening 66 of the main housing section 52. The springs 118 and 154 serve to bias the valve member 111 and the piston 146 to the positions shown in FIGURE 5. The above described control valve assembly 132 is adapted to be mounted to the retarder 20, and is adapted to have connection with a source of hydraulic fluid under pressure, the retarder 20 and a fluid receiver, in the same manner as the control valve assembly 50.

To activate the retarder 20, pressurized air is directed through the inlet 142 so as to move the piston 90 and valve member 84 to the right for connecting the source of hydraulic fluid under pressure with the inlet side of the retarder 20 as described in detail in connection with the operation of the control valve 50. Also, as described hereinabove, fluid under pressure leaving the retarder 20 is conveyed to the annular channel 112 of the valve member 111, and when the pressure of such fluid exceeds a predetermined valve determined by the rate of spring 118, the valve member 111 moves to the left placing the annular channel 112 in communication with the annular groove 80 thereby relieving the excess pressure.

The piston 90 and valve member 84 are arranged to be moved to the right under a lower air pressure than the piston 146. Accordingly, when the air introduced into the inlet 142 is at the minimum pressure required to move the piston 90 and valve member 84, the position of the piston 146 will remain unchanged. However, the pressure of the air introduced into the inlet 142 may be increased so as to move the piston 146 to a position between the limits of the position shown and a position in which the piston abuts the shoulder 156 defined by the main housing section 52 at the end of the opening 66. A change in the position of the piston 146 changes the rate of the spring 118 which in turn alters the pressure at which the valve member 111 will begin to modulate the flow of fluid under pressure from the outlet side of the retarder 20 to the fluid receiver. By reason of this arrangement, the pressure of the fluid within the retarder 20 may be varied to meet differing requirements of operation.

It is to be noticed that the main housing section 52 has been designed to accommodate interchangeably the extension section 56 of the valve assembly 50 and the extension section 134 of the valve assembly 132. For this reason, and because most of the parts of both valve assemblies are identical, manufacturing and assembling economies are realized. While the valve member 84 has been shown and described as being pneumatically operated, it will be appreciated that manually operated piston and linkage means may be substituted for the piston 90 and related parts. Finally, although a specific form of hydraulic fluid retarder has been shown and described, it will be apparent to those skilled in the art that the control systems, and valve assemblies of our present invention may be used in connection with other forms of hydraulic fluid retarders.

While we have shown and described what we believe to be preferred embodiments of our present invention, it will be understood by those skilled in the art that various rearrangements and modifications may be made therein without departing from the spirit and scope of our invention.

We claim:

1. In a hydraulic system including a hydraulic fluid retarder with an inlet side and an outlet side, a source of hydraulic fluid under pressure and hydraulic fluid receiver means, a control valve assembly comprising a first valve member having one position in which the source of hydraulic fluid is placed in communication with the hydraulic fluid receiver means for maintaining the hydraulic fluid retarder inactive, said first valve member having a second position in which the source of hydraulic fluid is placed in communication with the inlet side of the hydraulic fluid retarder for activating the latter, first spring means for biasing said first valve member to said first position, fluid operated means for moving said first valve member from said first position to said second position in opposition to said first spring means, a second valve member having a first position in which communication between the outlet side of the hydraulic fluid retarder and the hydraulic fluid receiver means is blocked, second spring means for biasing said second valve member to said first position, fluid operated means for varying the spring rate of said second spring means, and said second valve member when said first valve member is in said second position being movable in response to the pressure within the hydraulic fluid retarder to modulate communication between the outlet side of the hydraulic fluid retarder and the hydraulic fluid receiver means whereby to maintain a substantially constant pressure within the hydraulic fluid retarder for any given spring rate of said second spring means.

2. In a hydraulic system including a hydraulic fluid retarder with an inlet side and an outlet side, a source of hydraulic fluid under pressure and hydraulic fluid receiver means, first fluid passageway means for receiving fluid under pressure from the source of hydraulic fluid, second fluid passageway means for directing fluid to the hydraulic fluid receiver means, third fluid passageway means for directing fluid to the inlet side of the hydraulic fluid retarder, fourth fluid passageway means for receiving fluid from the outlet side of the hydraulic fluid retarder, a first valve member in a first position serving to place said first and second fluid passageway means in communication and in a second position serving to place the first and third fluid passageway means in communication, a second valve member for modulating communication between said fourth fluid passageway means and said second fluid passageway means when said first valve member is in its said second position, and fluid operated means for selectively biasing said second valve member so as to permit adjustment of said modulating communication whereby pressure within the hydraulic fluid retarder may be varied.

3. For use in a hydraulic system including a hydraulic fluid retarder with an inlet side and an outlet side, a source of hydraulic fluid under pressure and hydraulic fluid receiver means, a control valve assembly having first and second cylindrical valve chambers, said first valve chamber having a drain port and first, second, third and fourth annular grooves formed in the periphery thereof, said second valve chamber having first and second annular grooves formed in the periphery thereof, said first annular groove of said first valve chamber having communication with the hydraulic fluid receiver means and said first annular groove of said second valve chamber, said second annular groove of said first valve chamber having communication with the source of hydraulic fluid under pressure, said third annular groove of said first valve chamber having communication with the inlet side of the hydraulic fluid retarder, said fourth annular groove of said first valve chamber having communication with the second annular groove of said second valve chamber, said second annular groove of said second valve chamber having communication with the outlet side of the hydraulic fluid retarder, a first valve member in said first valve chamber and having first and second annular channels formed in the periphery thereof, said first annular channel in said first valve member serving to place said first and second annular grooves of said first valve chamber in communication and said second annular channel of said first valve member serving to place said fourth annular groove of said first valve chamber in communication with said drain port when said first valve member is in a first position, said first annular channel of said first valve member serving to place said second and third annular grooves of said first valve chamber in communication when said first valve member is in a second position, a second valve member in said second valve chamber and having an annular channel formed in the periphery thereof, and said second valve member when said first valve member is in said second position being movable in response to the pressure within the hydraulic fluid retarder whereby to permit said annular channel of said second valve member to modulate communication between said first and second annular grooves of said second valve chamber whereby to maintain a substantially constant pressure within the hydraulic fluid retarder.

4. The control valve assembly of claim 3 including first spring means within said first valve chamber for biasing said first valve member to said first position, fluid operated piston means within said first valve chamber for selectively moving said first valve member from said first position to said second position in opposition to said first spring means, and second spring means within said second valve chamber for biasing said second valve member to said first position.

5. The control valve assembly of claim 3 including first spring means within said first valve chamber for biasing said first valve member to said first position, fluid operated piston means within said first valve chamber for selectively moving said first valve member from said first position to said second position in opposition to said first spring means, second spring means within said second valve chamber for biasing said second valve member to said first position, and fluid operated piston means within said second valve chamber for selectively varying the spring rate of said second spring means so as to permit adjustment of the pressure that is to be maintained substantially constant in the hydraulic fluid retarder.

6. In a hydraulic control system, first fluid passageway means for receiving fluid under pressure, second fluid passageway means for directing fluid to fluid receiver means, third fluid passageway means for directing fluid to a hydraulic device, fourth fluid passageway means for receiving fluid from the hydraulic device, first valve means in one position serving to place said first and second passageway means in communication and in a second position serving to place said first and third passageway means in communication, first spring means for biasing said first valve means to said one position, fluid operated means for moving said first valve means from said one position to said second position in opposition to said first spring means, second valve means having a first position in which communication between the fourth fluid passageway means and said second fluid passageway means is blocked, said second valve means serving to modulate communication between said fourth fluid passageway means and said second fluid passageway means when said first valve means is in its said second position whereby to maintain a substantially constant pressure within the hydraulic device, second spring means for biasing said second valve means to said first position, and fluid operated means for selectively varying the spring rate of said second spring means so as to permit adjustment of the pressure that is to be maintained substantially constant in the hydraulic device.

References Cited by the Examiner
UNITED STATES PATENTS

| | | | |
|---|---|---|---|
| 1,610,830 | 12/1926 | Walker | 188—90 |
| 2,263,421 | 11/1941 | Harrington | 91—446 X |
| 2,790,519 | 4/1957 | Crankshaw | 188—90 |

FERGUS S. MIDDLETON, *Primary Examiner.*

MILTON BUCHLER, *Examiner.*

G. E. A. HALVOSA, *Assistant Examiner.*